US011913272B2

(12) United States Patent
Hsieh

(10) Patent No.: US 11,913,272 B2
(45) Date of Patent: Feb. 27, 2024

(54) SECTIONAL LIFTING DOOR SYSTEM

(71) Applicant: Chung Hsien Hsieh, New Taipei (TW)

(72) Inventor: Chung Hsien Hsieh, New Taipei (TW)

( * ) Notice: Subject to any disclaimer, the term of this patent is extended or adjusted under 35 U.S.C. 154(b) by 0 days.

(21) Appl. No.: 18/170,610

(22) Filed: Feb. 17, 2023

(65) Prior Publication Data

US 2023/0313592 A1 Oct. 5, 2023

(30) Foreign Application Priority Data

Mar. 29, 2022 (TW) ................................. 111111846

(51) Int. Cl.
*E05F 15/686* (2015.01)
*E05F 15/668* (2015.01)

(52) U.S. Cl.
CPC .......... *E05F 15/686* (2015.01); *E05F 15/668* (2015.01); *E05Y 2201/71* (2013.01); *E05Y 2900/106* (2013.01)

(58) Field of Classification Search
CPC ..... E05F 15/686; E05F 15/681; E05F 15/684; E05F 15/668; E05Y 2900/106; E05Y 2201/71; E05D 13/003
See application file for complete search history.

(56) References Cited

U.S. PATENT DOCUMENTS

| | | | | |
|---|---|---|---|---|
| 3,436,862 | A * | 4/1969 | Stansberry | E05F 15/686 474/1 |
| 3,685,567 | A * | 8/1972 | Pemberton | E05D 13/1261 49/7 |
| 5,263,527 | A * | 11/1993 | Marlatt | E06B 9/74 160/310 |
| 5,494,093 | A * | 2/1996 | Eiterman | E05D 13/003 160/300 |
| 5,931,212 | A * | 8/1999 | Mullet | F16D 41/04 74/625 |
| 6,862,845 | B2 * | 3/2005 | Schiks | E05D 13/1269 49/200 |
| 7,254,868 | B2 * | 8/2007 | Mullet | E05D 13/1261 160/191 |
| 7,543,625 | B2 * | 6/2009 | Beaudoin | E05D 13/1269 160/302 |
| 8,397,787 | B1 * | 3/2013 | Daus | E05F 15/71 160/1 |
| 8,905,113 | B2 * | 12/2014 | Daus | E06B 9/08 160/1 |

(Continued)

*Primary Examiner* — Justin B Rephann
(74) *Attorney, Agent, or Firm* — McClure, Qualey & Rodack, LLP

(57) ABSTRACT

The present invention relates to a sectional lifting door system. When the system is in normal operation, a door operator drives a cable drum to wind or unwind a cable for lifting or lowering slats. During a process of lowering the slats, if the slats is stopped or slowed unexpectedly (e.g. the slats hit an obstacle below), the door operator is disconnected from a shaft automatically. At this time, even if the door operator is still activated, the shaft does not rotate, the cable drum does not unwind the cable so that a certain tension force can be maintained on the cable and that the cable is prevented from loosening from the drum, thereby preventing the slats from falling off. Also, it can avoid the situation that the weight of the slats is completely applied to the obstacle because the cable drum continuously unwinds the cable.

9 Claims, 10 Drawing Sheets

(56) References Cited

U.S. PATENT DOCUMENTS

| | | | | |
|---|---|---|---|---|
| 9,376,864 | B2 * | 6/2016 | Hsieh | E06B 9/08 |
| 10,329,816 | B2 * | 6/2019 | Wong | E06B 9/06 |
| 10,815,718 | B2 * | 10/2020 | Schweiss | E05F 15/605 |
| 11,261,660 | B2 * | 3/2022 | Hebeisen | E06B 9/50 |
| 2002/0170688 | A1 * | 11/2002 | Daus | E06B 9/60<br>160/315 |
| 2003/0201077 | A1 * | 10/2003 | Mullet | E05D 15/24<br>160/192 |
| 2006/0137138 | A1 * | 6/2006 | Mullet | E05D 13/1261<br>16/197 |
| 2017/0241177 | A1 * | 8/2017 | Wong | E05D 13/10 |
| 2018/0305968 | A1 * | 10/2018 | Ferri | E05B 47/0005 |

* cited by examiner

SECTIONAL LIFTING DOOR SYSTEM

BACKGROUND OF THE INVENTION

Field of the Invention

The present invention relates to a sectional lifting door system, in particular to a garage door or overhead door which can be vertically lifted or lowered by means of a cable drive.

Description of the Related Art

In a sectional lifting garage door, a torsional spring is mainly used to assist in lifting or lowering slats, and the lifting force of the torsional spring is transmitted by a cable. The cable is wound around a drum disposed on a side of the door, and the drum is driven by the torsion spring so as to wind or unwind the cable, thereby lifting or lowering the slats. In order to normally lift or lower the slats, the cable has to be properly tensioned. Once the cable is not tensioned (e.g. the cable breaks or loosens), the slats would fall off. It is dangerous.

The following are several common reasons for the failure of the cable: (1) the torsional spring breaks or loosens, resulting in that the cable is not tensioned and loosens from the drum; (2) the slats hit an obstacle or get stuck, resulting the tensile force applied to the cable is reduced (at this time, the cable may easily loosen from the drum); (3) a torsional spring or a drum is incorrectly configured. In particular, when one cable on one side loosens from the drum, since the other cable on the other side bears greater weight, the cable with a larger load may break, resulting in that the slats fall off.

For the most common situation that the slats are lowered and hits an obstacle, in the prior art, photoelectric sensors are commonly installed on two sides of a door frame, wherein one side is a transmitting end, and the other side is a receiving end. Once a detection light sent by the transmitting end is blocked by an obstacle present between the transmitting end and the receiving end, the motor assembly would be deactivated so that lowering of the slats is stopped. In many cases, an obstacle such as a transparent object or a hollow object is unable to block the detection light, resulting in that the slats hits the obstacle. At this time, the motor assembly is still being activated, causing the cable to loosen from the drum and the failure of the entire garage door. Moreover, the weight of the slats applied to the obstacle may crush the obstacle or cause damage to a human body beneath the slats.

The existing garage door uses the torsional spring to assist in lifting or lowering the slats so the user can easily open the door. However, this also makes the anti-theft facility become more important. In the prior art, an extra lock is usually required to prevent unauthorized opening of the door, but the user must lock and unlock the door frequently.

As such, a sectional lifting door system which has a simple structure and high reliability and which is capable of effectively preventing the cable from loosening from the drum and of realizing the anti-theft function is highly expected in the industry and the public.

SUMMARY OF THE INVENTION

The main object of the present invention is to provide a sectional lifting door system which is capable of effectively preventing a cable from loosening from a drum in the case that slats hit an obstacle or get stuck and thus preventing the slats from falling off.

In order to achieve the above-mentioned object, a sectional lifting door system of the present invention mainly comprises a shaft, a torsional spring, at least one cable drum, at least one slat, at least one cable and a door operator, wherein the cable drum is disposed on the shaft; one end of the cable is connected to the cable drum, and the other end of the cable is connected to the slat; the door operator is kinematically connected to the shaft and includes a ratchet, a sleeve and a pawl. The ratchet is connected to an output shaft and includes a plurality of tooth spaces; each tooth space includes a bottom wall, a first flank and a second flank; an included angle between the first flank and the bottom wall is less than or equal to 90 degrees, an included angle between the second flank and the bottom wall is greater than 90 degrees. The sleeve is fitted on the output shaft and kinematically connected to the shaft. The pawl is disposed on the sleeve and selectively engaged with one of the plurality of tooth spaces of the ratchet; the pawl includes a first surface and a second surface; the first surface is used for correspondingly contacting the first flank of the tooth space; the second surface is used for correspondingly contacting the second flank of the tooth space. When the slat is to be lifted, the output shaft is rotated so that the first flank of one of the plurality of tooth spaces of the ratchet is brought into contact with the first surface of the pawl, thereby driving the sleeve to rotate, and the sleeve further drives the shaft to wind the cable around the cable drum; when the slat is to be lowered, the output shaft is rotated so that the second flank of one of the plurality of tooth spaces of the ratchet is brought into contact with the second surface of the pawl, thereby driving the sleeve to rotate, and the sleeve further drive the shaft to unwind the cable from the cable drum; during a process of lowering the slat, when a tensile force acting on the cable drum is reduced, the second flank of one of the plurality of tooth spaces of the ratchet is disengaged from the second surface of the pawl so that rotation of the sleeve, the shaft and the cable drum is stopped.

Accordingly, in the sectional lifting door system of the present invention, by means of the arrangement of the ratchet and the pawl, when the system is in normal operation, the shaft is driven to rotate by the door operator, and then the cable is wound or unwound by the cable drum, thereby lifting or lowering the slat. On the other hand, during the process of lowering the slat, when the slat is slowed or stopped unexpectedly (e.g. the slat hits an obstacle below), the pawl is slidably moved out of the plurality of tooth spaces of the ratchet, and the door operator is kinematically disconnected from the shaft. At this time, even if the door operator is still being activated, the shaft is not rotated, and the cable drum does not unwind the cable so that a certain tensile force applied to the cable is maintained. Accordingly, it can completely prevent the cable from loosening from the drum, thereby preventing the slat from falling off. Also, it can avoid the situation that the weight of the slat is completely applied to the obstacle as the cable drum continuously unwinds the cable.

Preferably, in the sectional lifting door system of the present invention, the door operator further includes a driving gear, a driven gear, a driven shaft and a rotation-stopping module, wherein the driving gear can be disposed on the sleeve; the driven gear can be disposed on the driven shaft and engaged with the driving gear; the driven shaft can be connected to the shaft; and the rotation-stopping module can be disposed on the driven shaft. In the case that the motor assembly is not activated, the driven shaft is braked by the rotation-stopping module. When the motor assembly is deactivated, the mechanism of the entire door operator is locked, and the torsional spring is unable to auxiliary share the load of the slat so that it is difficult to lift the slat due to the heavy weight of the slat, thereby achieving the anti-theft effect.

DESCRIPTION OF THE PREFERRED EMBODIMENTS

Figure 1:
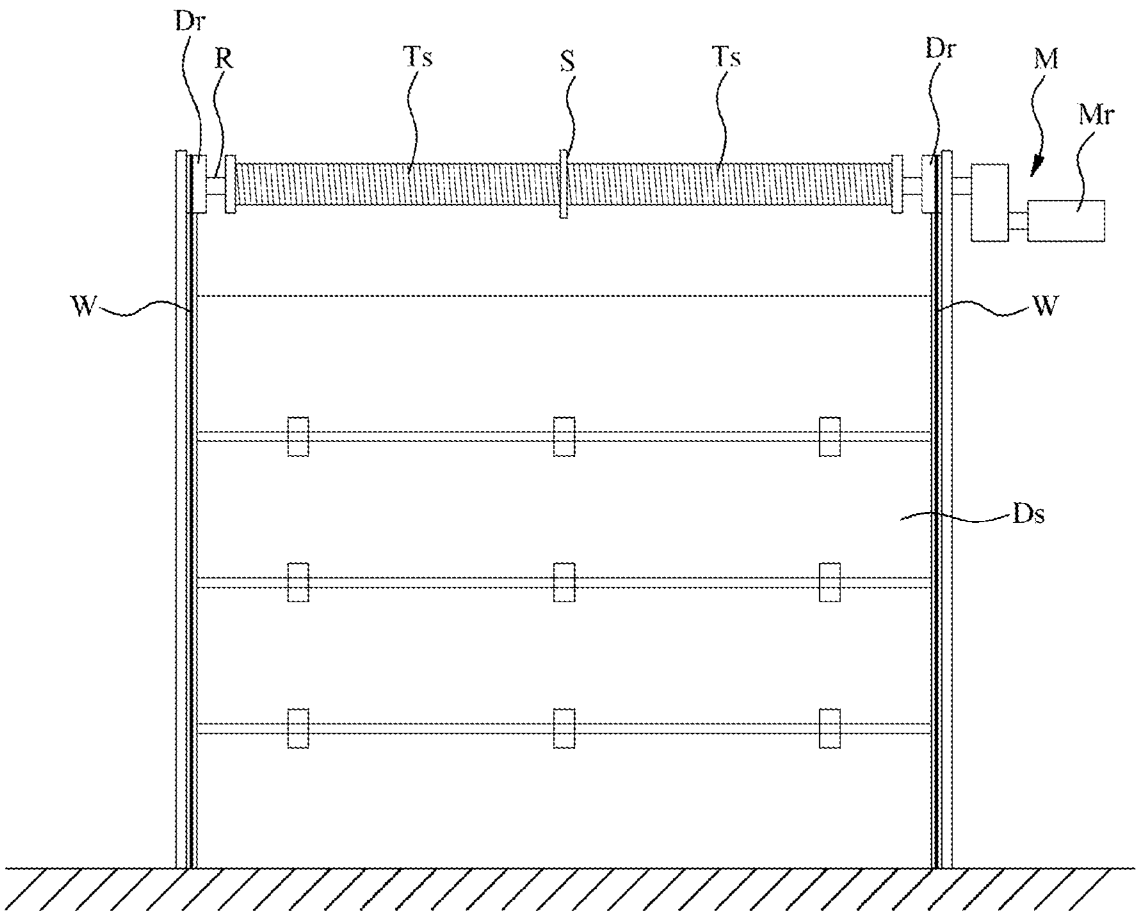
FIG. 1 is a schematic view of a sectional lifting door system of the present invention.

Before a sectional lifting door system of the present invention is described in detail in embodiments, it should be noted that in the following description, similar components will be designated by the same reference numerals. Furthermore, the drawings of the present invention are for illustrative purposes only, they are not necessarily drawn to scale, and not all details are necessarily shown in the drawings.

Figure 2:
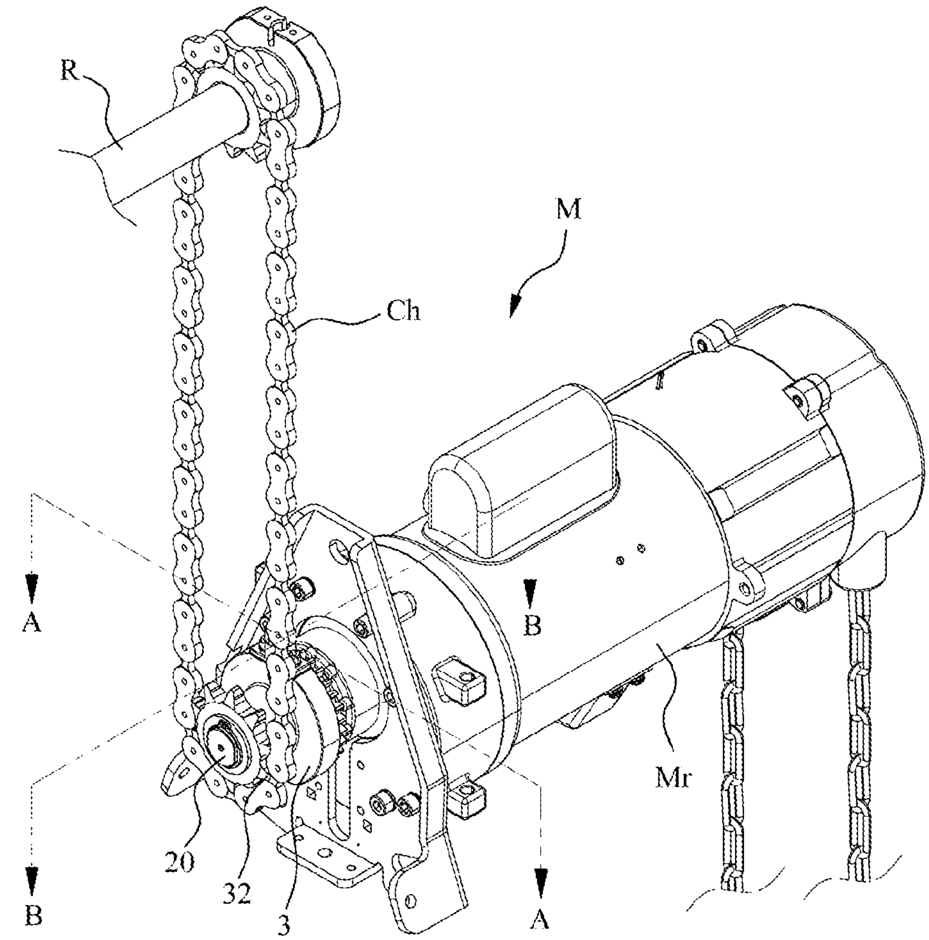
FIG. 2 is a perspective view of a first embodiment of a door operator of the present invention.
Figure 3A:
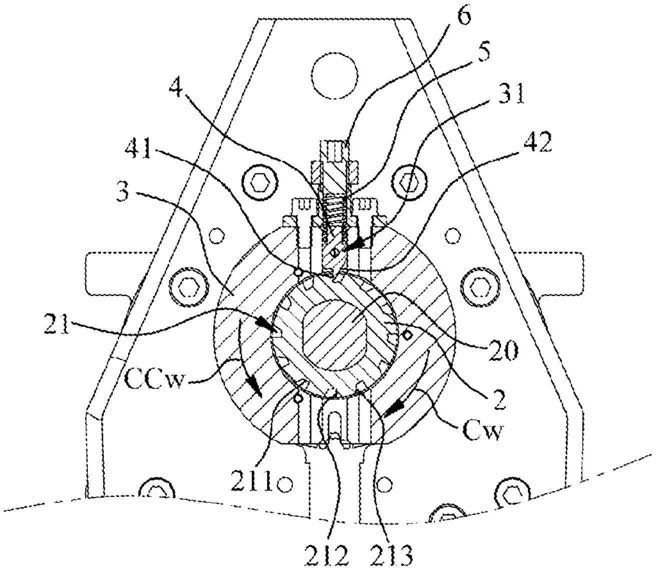
FIG. 3A is a cross-sectional view taken along a line AA in FIG. 2.
Figure 3B:
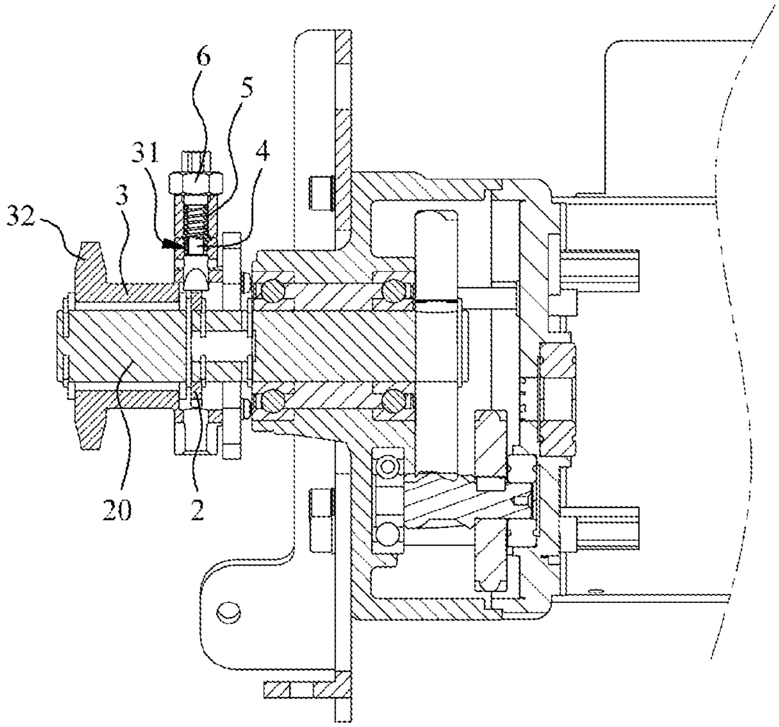
FIG. 3B is a cross-sectional view taken along a line BB in FIG. 2.

Reference is made to FIG. 1, FIG. 2, FIG. 3A and FIG. 3B. FIG. 1 is a schematic view of the sectional lifting door system of the present invention; FIG. 2 is a perspective view of a first embodiment of a door operator of the present invention; FIG. 3A is a cross-sectional view taken along a line AA in FIG. 2; and FIG. 3B is a cross-sectional view taken along a line BB in FIG. 2. As shown in FIG. 1, the sectional lifting door system of the present invention mainly comprises a shaft R, two torsional springs Ts, two cable drums Dr, four slats Ds, two cables W and a door operator M, wherein the two cable drums Dr are disposed on two ends of the shaft R respectively, one end of each cable W is connected to the respective cable drum Dr, and the other end of each cable W is connected to the bottom end of the lowest slat Ds.

The two torsional springs Ts are fitted on the shaft R. One end of each torsional spring Ts is connected to a spring support S mounted on a wall, and the other end of each torsional spring Ts is connected to the shaft R. The torsional springs Ts are used to apply a specific preloaded torsion force on the shaft R. Under normal circumstances, when the slats Ds are positioned to a middle position, the specific torsion force offsets the weight of the slats Ds so that the slats Ds are in force equilibrium and maintained at the middle position; when the slats are located at a lower limit position, the specific torsion force offsets most of the weight of the slats Ds so that the user can easily lift up the slats Ds for opening the door; when the slats are located at an upper limit position, the specific torsion force is greater than the weight of the slats Ds so that the slats Ds can be maintained at the upper limit position, and the user can also easily pull down the slats Ds for closing the door.

Reference is made to FIG. 1, FIG. 2, FIG. 3A and FIG. 3B again. The door operator M of this embodiment mainly includes a ratchet 2, a sleeve 3, a pawl 4, a spring 5, an adjustable bolt 6 and a motor assembly Mr. The ratchet 2 is fitted on an output shaft 20, the output shaft 20 is connected to the rotor of the motor assembly Mr (not shown in the figure), and the ratchet 2 includes a plurality of tooth spaces 21. Each tooth space 21 includes a bottom wall 211, a first flank 212 and a second flank 213. The included angle between the first flank 212 and the bottom wall 211 is 90 degrees, and the included angle between the second flank 213 and the bottom wall 211 is greater than 90 degrees. The sleeve 3 is fitted on the output shaft 20 and provided with a sprocket 32 which is kinematically connected to the shaft R through a chain Ch (see FIG. 2).

As shown in FIG. 3A and FIG. 3B, the pawl 4 is disposed on the sleeve 3 and selectively engaged with one of the tooth spaces 21 of the ratchet 2. Specifically, the sleeve 3 is formed with a radial through hole 31, the pawl 4 and the spring 5 are accommodated in the radial through hole 31, the pawl 4 protrudes from one end of the radial through hole 31, the adjustable bolt 6 is screwed into the other end of the radial through hole 31, and the spring 5 is interposed between the adjustable bolt 6 and the pawl 4. By tightening or loosening the adjustable bolt 6, the compression degree of the spring 5 can be adjusted, thereby adjusting the pressing force of the pawl 4 against the ratchet 2. For example, if the spring 5 is aged and elastic fatigue occurs, then the adjustable bolt 6 can be properly tightened to maintain the pressing force of the pawl 4.

The pawl 4 of this embodiment includes a first surface 41 and a second surface 42, wherein the first surface 41 is used for correspondingly contacting the first flank 212 of the tooth space 21, and the second surface 42 is used for correspondingly contacting the second flank 213 of the tooth space 21. In this embodiment, the first surface 41 is a radial plane, which can match the angle of the first flank 212; and the included angle between the first surface 41 and the second surface 42 is an acute angle so the second surface 42 can also just match the angle of the second flank 213.

The specific operation of this embodiment will be described below. In the case that the slats Ds are to be lifted, the output shaft 20 drives the ratchet 2 to rotate in a first rotation direction CW (see FIG. 3A) so that the first flank 212 of the tooth space 21 where the pawl 4 is located is brought into contact with the first surface 41 of the pawl 4. Due to the orientation of the first surface 41 of the pawl 4 and the first flank 212 of the tooth space 21, the ratchet 2 drives the sleeve 3 to rotate without occurrence of slipping between the first surface 41 of the pawl 4 and the first flank 212 of the tooth space 21. At this time, the sleeve 3 drives the shaft R to rotate through the sprocket 32 and the chain Ch so that the cable drum Dr winds the cable W so as to lift the slats Ds.

On the other hand, in the case that the slats Ds are to be lowered, the output shaft 20 drives the ratchet 2 to rotate in a second rotation direction CCW (see FIG. 3A) so that the second flank 213 of the tooth space 21 where the pawl 4 is located is brought into contact with the second surface 42 of the pawl 4 and drives the sleeve 3 to rotate. At this time, the sleeve 3 drives the shaft R to rotate through the sprocket 32 and the chain Ch so that the cable drum Dr unwinds the cable W so as to lower the slats Ds.

During the process of lowering the slats Ds, when a tensile force acting on the cable drum Dr is reduced (for example, the slats Dr hit an obstacle or a person below), due to the angle design of the second surface 42 of the pawl 4 and the second flank 213 of the tooth space 21, the second surface 42 of the pawl 4 can be easily disengaged from the second flank 213 of the tooth space 21, that is, the output shaft 20 and the ratchet 2 become idling, and rotation of the sleeve 3, the shaft R and the cable drum Dr is stopped, thereby maintaining the pulling force of the cable W and preventing the cable W from loosening from the cable drum Dr. Moreover, by means of a configuration of a software, if the slats Ds hit an obstacle or a person below and if rotation of the sleeve 3, the shaft R and the cable drum Dr is stopped, then in the present embodiment, the rotor of the motor assembly Mr could be rotated in a reversed direction, that is, the slats Ds are actively lifted to avoid more serious accidents. The specific technical content will be described in detail later.

In this embodiment, the sensitivity of the slats Ds for sensing an obstacle can be further adjusted by tightening or loosening the adjustable bolt 6. For example, if the adjusting bolt 6 is screwed more tightly, then the spring 5 is further compressed. The output shaft 20 and the ratchet 2 become idling only when the degree of reduction of the tensile force acting on the cable drum Dr has to be greater (i.e. the obstacle or the person under the slats Ds has to bear more weight of the slats). On the contrary, if the adjustable bolt 6 is screwed more loosely, the sensitivity of the slats Ds for sensing an obstacle becomes more sensitive. The output shaft 20 and the ratchet 2 become idling as long as the tensile force acting on the cable drum Dr is slightly reduced (i.e. the obstacle or the person under the slats Ds bears less weight of the slats Ds).

Figure 4A:
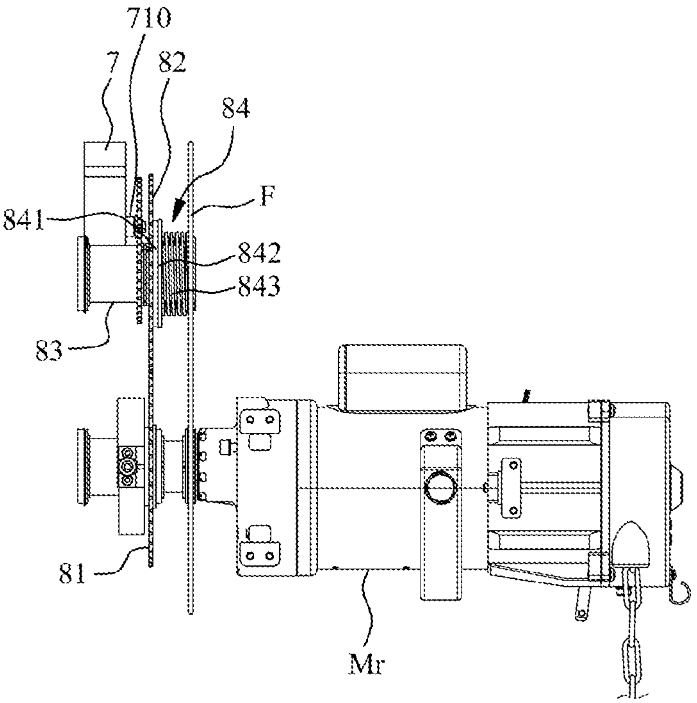
FIG. 4A is a front view of a second embodiment of the door operator of the present invention.

Reference is made to FIG. 4A, which is a front view of a second embodiment of the door operator of the present invention. The main difference between the second embodiment and the first embodiment lies in that the second embodiment has an anti-theft function. When the motor assembly Mr is not deactivated, the entire shaft R is locked by a rotation-stopping module 84 for preventing the slats Ds from being opened without authorization.

Specifically, the door operator M of this embodiment further includes a driving gear 81, a driven gear 82, a driven shaft 83 and the rotation-stopping module 84. The driving gear 81 is secured to an end face of the sleeve 3, the driven gear 82 is disposed on the driven shaft 83 and engaged with the driving gear 81, the driven shaft 83 is connected to the shaft R, the rotation-stopping module 84 is disposed between the driven shaft 83 and a frame F, and the frame F is a device-fixing structure connected to a wall. The rotation-stopping module 84 of this embodiment includes a driven disc 841, a brake disc 842 and a compression spring 843. The driven disc 841 is secured to the driven shaft 83, the brake disc 842 is fitted on the driven shaft 83 but slidable and rotatable with respect to the driven shaft 83, one end of the compression spring 843 is abutted against the brake disc 842, and the other end of the compression spring 843 is abutted against the frame F. The brake disc 842 is normally biased against the driven disc 841 by the compression spring 843 for braking the driven shaft 83.

The rotation-stopping module 84 of this embodiment normally brakes the driven shaft 83. Only when the motor assembly Mr is activated, the torque output by the motor assembly Mr overcomes the frictional force between the brake disc 842 and the driven disc 841 so that the slats Ds can be lifted or lowered. In the case that the motor assembly Mr is not activated, the rotation-stopping module 84 effectively brakes the driven shaft 83 for preventing the slats Ds from being opened without authorization.

Figure 4B:
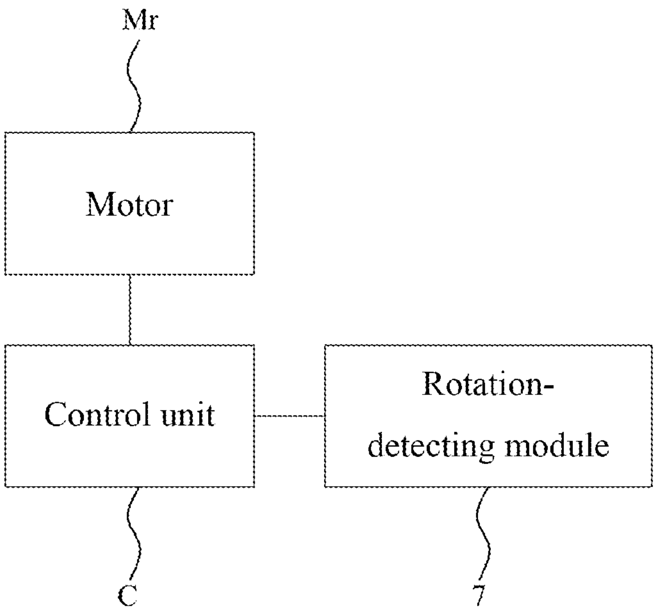
FIG. 4B is a system architecture diagram of the second embodiment of the door operator of the present invention.

Reference is made to FIG. 4B, which is a system architecture diagram of the second embodiment of the door operator of the present invention. This embodiment is further provided with a control unit C and a rotation-detecting module 7 for realizing multi-function control. As shown in FIG. 4B, the motor assembly Mr and the rotation-detecting module 7 are electrically connected to the control unit C; the motor assembly Mr is adapted to be controlled by the control unit C to drive the output shaft 20 to rotate; and the rotation-detecting module 7 is adapted to be controlled by the control unit C to detect whether the shaft R rotates or not. In this embodiment, a rotary encoder such as an optical encoder, a magnetic induction encoder, a mechanical limit structure cooperating with a photoelectric switch, or a Hall effect sensor which is capable of detecting rotation, is used as the rotation-detecting module 7.

During the process of lowering the slats Ds, if the rotation-detecting module 7 detects that rotation of the shaft R is stopped (i.e. the tensile force acting on the cable drum Dr is reduced) prior to arrival of the slats Ds at a lower limit position, then the control unit C deactivates the motor assembly M or causes the motor assembly M to rotate in a reverse direction so that the cable drum Dr winds the cable W to lift the slats Ds to an upper limit position. When the slats Ds is stopped unexpectedly (e.g. the slats Ds hit an obstacle), the slats Ds would be lifted immediately so as to avoid an accident caused by keeping lowering the slats Ds.

Figure 5A:
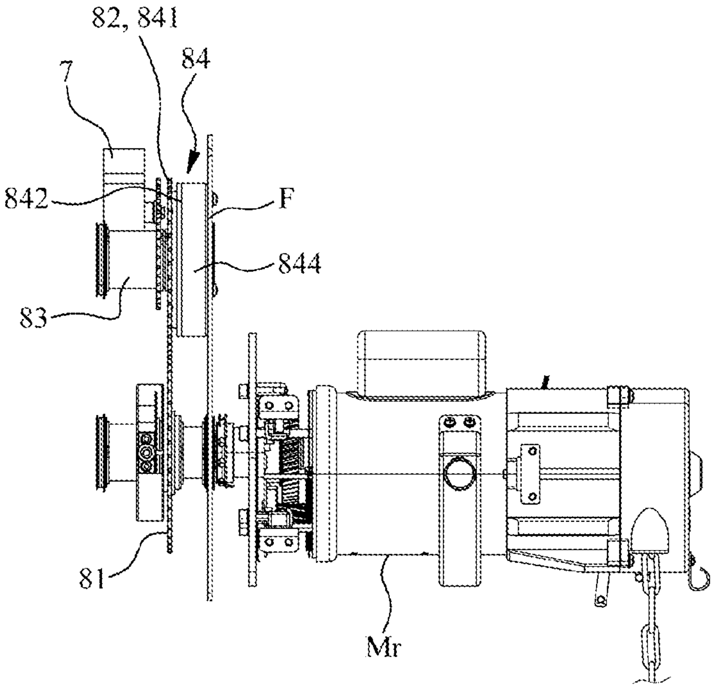
FIG. 5A is a front view of a third embodiment of the door operator of the present invention.
Figure 5B:
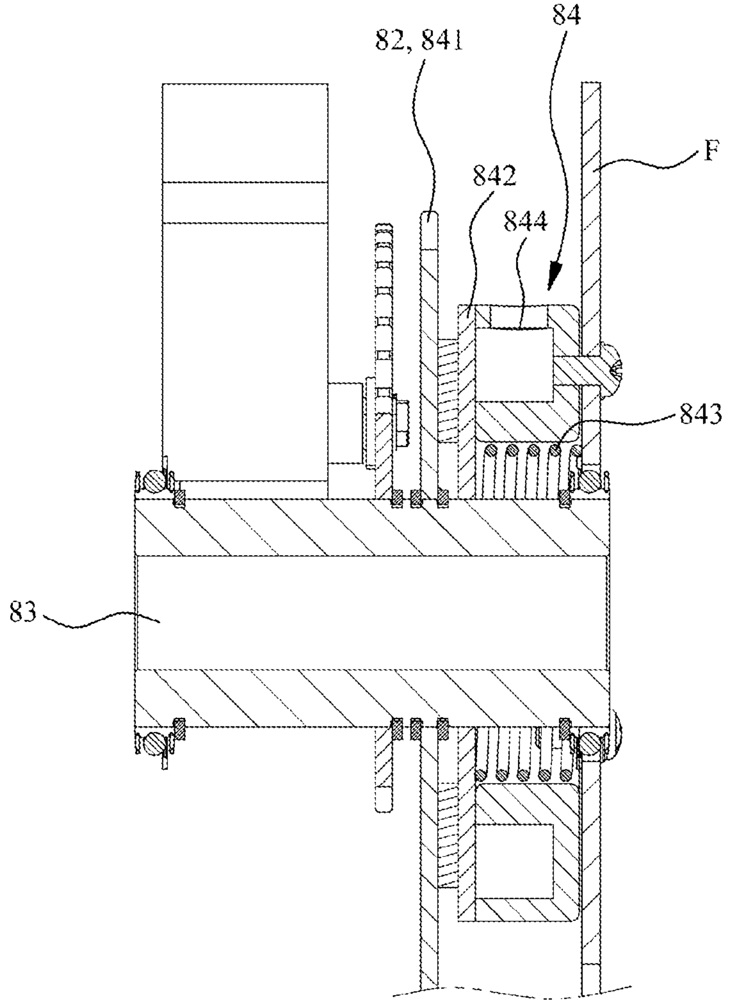
FIG. 5B is a cross-sectional view taken along the axial direction of a driven shaft in the third embodiment of the door operator of the present invention.

Reference is made to FIG. 5A and FIG. 5B. FIG. 5A is a front view of a third embodiment of the door operator of the present invention, and FIG. 5B is a cross-sectional view taken along the axial direction of the driven shaft in the third embodiment of the door operator of the present invention. The main difference between the third embodiment and the second embodiment lies in the structure of the rotation-stopping module 84. The rotation-stopping module 84 of the second embodiment normally brakes the driven shaft 83 while the rotation-stopping module 84 of the third embodiment actively brakes the driven shaft 83 only when the motor assembly Mr is deactivated.

The rotation-stopping module 84 of this embodiment not only includes the driven disc 841, the brake disc 842 and the compression spring 843 but also includes a magnetic field-generating unit 844. The driven disc 841 is secured to the driven shaft 83. In this embodiment, the driven gear 82 is directly used as the driven disc 841; one end of the compression spring 843 is abutted against the brake disc 842, the other end of the compression spring 843 is abutted against the frame F, and the brake disc 842 is normally biased against the driven disc 841 by the compression spring 843 for braking the driven shaft 83. The magnetic field-generating unit 844 is mainly composed of a coil which generates a magnetic field when the coil is electrically energized. The magnetic field-generating unit 844 is disposed on the frame F and configured to attract the brake disc 842. When the motor assembly Mr is activated, the magnetic field-generating unit 844 generates a magnetic field synchronously for attracting the brake disc 842 so that the brake disc 842 is separated from the driven disc 841 for releasing brake of the driven shaft 83. When the motor assembly Mr is deactivated, the magnetic field-generating unit 844 does not generate the magnetic field for attraction so that the brake disc 842 is biased against the driven disc 841 by the compression spring 843 for braking the driven shaft 83 and for the anti-theft function.

Figure 6A:
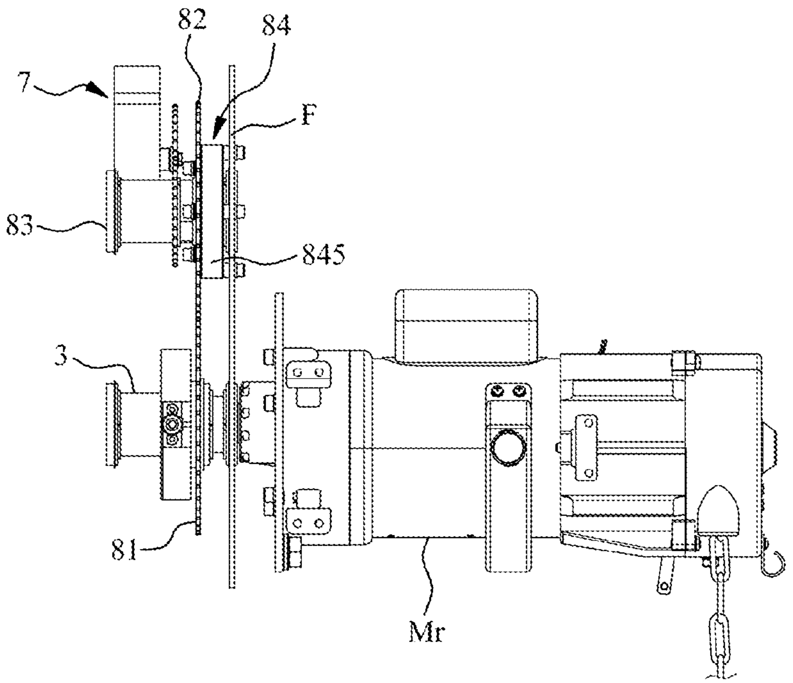
FIG. 6A is a front view of a fourth embodiment of the door operator of the present invention.
Figure 6B:
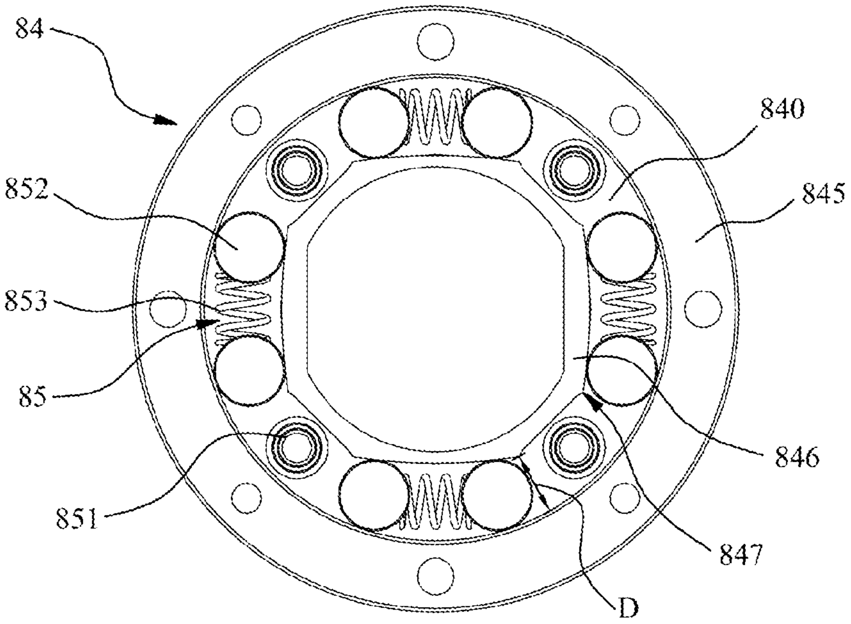
FIG. 6B is a cross-sectional view taken along the radial direction of a rotation-stopping module in the fourth embodiment of the door operator of the present invention.

Reference is made to FIG. 6A and FIG. 6B. FIG. 6A is a front view of a fourth embodiment of the door operator of the present invention, and FIG. 6B is a cross-sectional view taken along the radial direction of a rotation-stopping module in the fourth embodiment of the door operator of the present invention. The main difference between this embodiment and the second and third embodiments lies in the structure of the rotation-stopping module 84. As shown in FIG. 6B, the rotation-stopping module 84 of this embodiment mainly includes a fixed sleeve 845, a movable rotary disc 840, a movable sleeve 846 and a sleeve clutch mechanism 85. The fixed sleeve 845 is connected to the Frame F and is completely stationary.

The movable rotary disc 840 is connected to the driven gear 82, and the driven gear 82 is engaged with the driving gear 81. The movable sleeve 846 is secured to the driven shaft 83. The sleeve clutch mechanism 85 is disposed among the fixed sleeve 845, the movable rotary disc 840 and the movable sleeve 846. The sleeve clutch mechanism 85 of this embodiment includes four fixed columns 851, four springs 853 and eight movable columns 852, and these components are accommodated in a gap between the fixed sleeve 845 and the movable sleeve 846. The four fixed columns 851 are equidistantly disposed on the movable rotary disc 840 in the circumferential direction of the driven shaft 83. Two movable columns 852 and one spring 853 are arranged between every two fixed columns 851, and the spring 853 is arranged between the two movable columns 852 for biasing the two movable columns 852 away from each other.

The movable sleeve 846 is provided with eight radial protrusions 847, and the distance D between each radial protrusion 847 and the inner circumferential surface of the fixed sleeve 845 is set to be greater than the diameter of the fixed column 851 but less than the diameter of the movable column 852. Accordingly, the fixed column 851 can move freely in the gap between the fixed sleeve 845 and the movable sleeve 846 while the movable column 852 would be blocked by the radial protrusion 847.

In other words, when the motor assembly Mr is activated and the sleeve 3 is rotated with the motor assembly Mr, the driven gear 82 drives the movable rotary disc 840 to rotate. At this time, the fixed columns 851 push the movable columns 852 to move in the gap between the fixed sleeve 845 and the movable sleeve 846, and the movable columns 852 push the movable sleeve 846 to rotate, thereby driving the shaft R to rotate. On the other hand, when the movable rotary disc 840 is not in rotation (i.e. the motor assembly Mr is deactivated), even if someone tries to rotate the shaft R, since the eight movable columns 852 are locked between the radial protrusions 847 and the fixed sleeve 845, the movable sleeve 846 is locked in the fixed sleeve 845 and cannot be rotated. In this way, when someone tries to open the slats Ds without authorization, the shaft R would be completely locked and cannot be rotated, that is, the torsional spring on the shaft R cannot function to assist in opening so that it is difficult to lift the slats, thereby realizing the anti-theft function.

Figure 7:
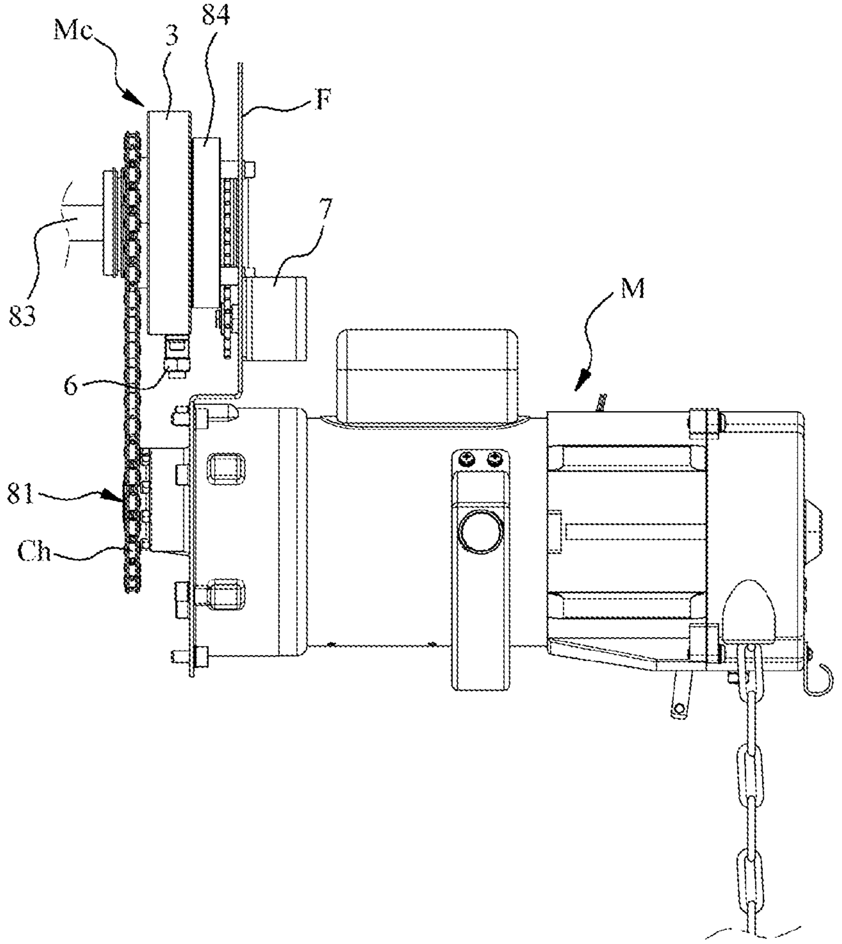
FIG. 7 is a front view of a fifth embodiment of the door operator of the present invention.

Reference is made to FIG. 7, which is a front view of a fifth embodiment of the door operator of the present invention. The main components of this embodiment are the same as those of the fourth embodiment, and the only difference lies in the configuration of a ratchet module Mc, a rotation-stopping module 84 and a rotation-detecting module 7. The ratchet module Mc includes the ratchet 2, the sleeve 3, the pawl 4, the spring 5, the adjustable bolt 6 as mentioned in the foregoing embodiment (see FIG. 3A). In this embodiment, the ratchet module Mc and the rotation-stopping module 84 are coaxially disposed on the driven shaft 83, and the rotation-detecting module 7 is disposed on the frame F and coupled to the driven shaft 83 through a gear for detecting whether the driven shaft 83 rotates or not. In other embodiments, the rotational amount of the driven shaft 83 can also be directly detected.

Accordingly, when the motor assembly Mr drives the driving gear 81 to rotate, the driving gear 81 drives the sleeve 3 to rotate through a chain Ch, and the sleeve 3 further drives the driven shaft 83 to rotate for lifting or lowering the slats. On the other hand, as in the previous embodiments, during the process of lowering the slats, when the tensile force acting on the cable drum is reduced, the sleeve 3 of the ratchet module Mc becomes idling, and rotation of the driven shaft 83 is stopped for preventing the cable from loosening from the cable drum. If the driven shaft 83 is to be rotated without authorization, the driven shaft 83 would be locked by the rotation-stopping module 84, thereby realizing the anti-theft function.

Figure 8:
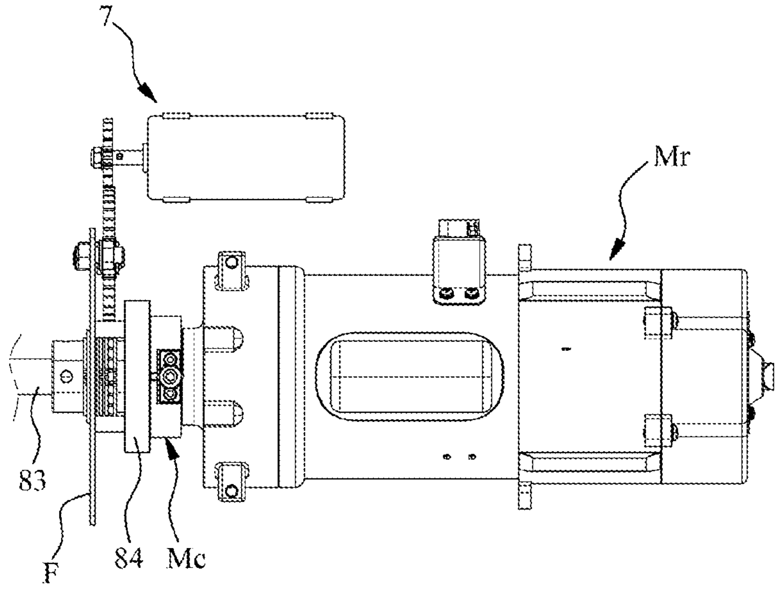
FIG. 8 is a top view of a sixth embodiment of the door operator of the present invention.

Reference is made to FIG. 8, which is a top view of a sixth embodiment of the door operator of the present invention. The main components of the sixth embodiment of the present invention are the same as those of the aforementioned fourth and fifth embodiments, and the only difference lies in the configuration of the ratchet module Mc, the rotation-stopping module 84 and the rotation-detecting module 7. In the sixth embodiment, the ratchet module Mc, the rotation-stopping module 84, the driven shaft 83 and the motor assembly Mr are all coaxially arranged, and the rotation-detecting module 7 is coupled to the driven shaft 83 through a gear and arranged on one side of the motor assembly Mr. Also, the operation of the present embodiment is similar to those of the above-mentioned fourth and fifth embodiments and hence is omitted.

Figure 9A:
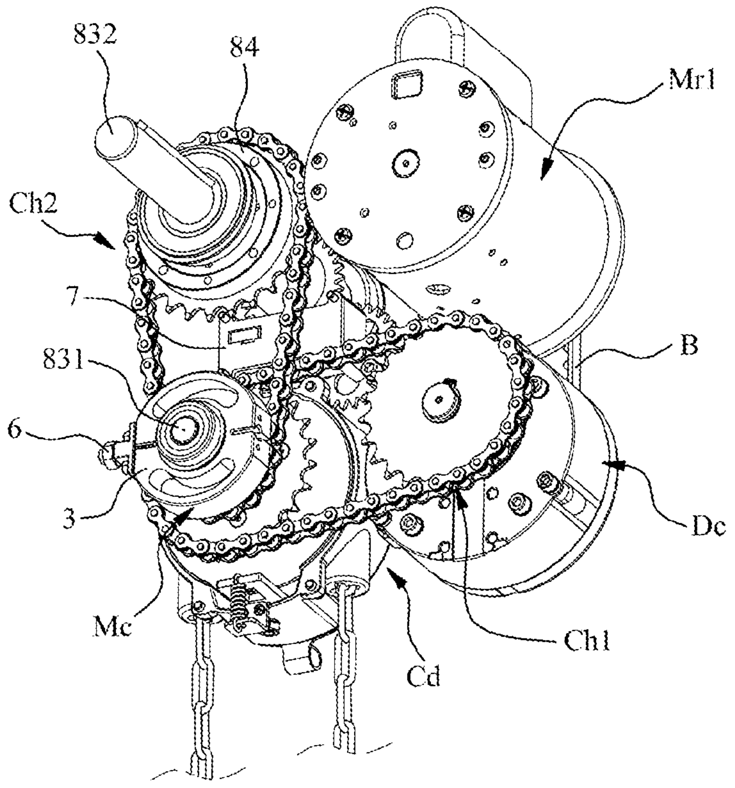
FIG. 9A is a perspective view of a seventh embodiment of the door operator of the present invention.
Figure 9B:
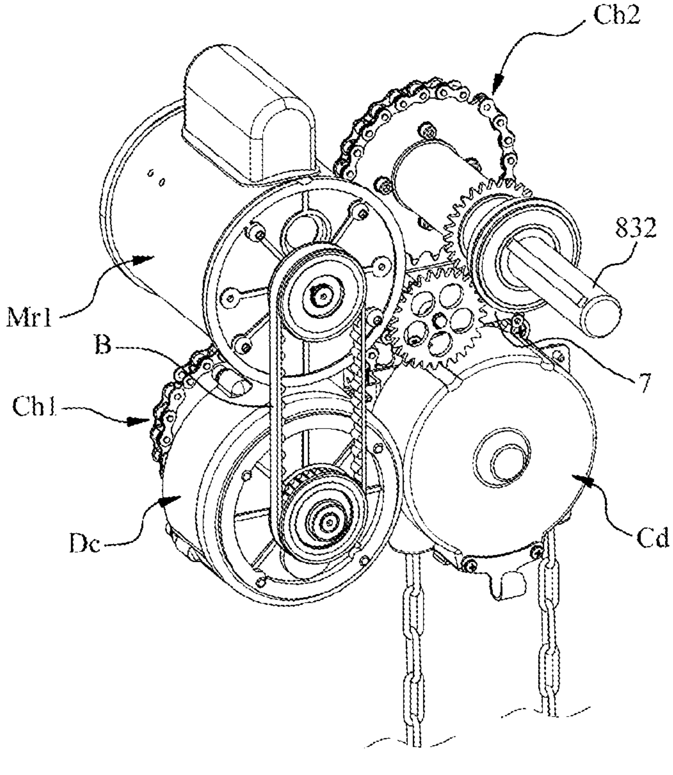
FIG. 9B is another perspective view of the seventh embodiment of the door operator of the present invention.

Reference is made to FIG. 9A and FIG. 9B. FIG. 9A is a perspective view of a seventh embodiment of the door operator of the present invention, and FIG. 9B is another perspective view of the seventh embodiment of the door operator of the present invention. In this embodiment, a deceleration module Dc and a manual chain disc module Cd of the motor assembly Mr in the previous embodiments are detached and installed coplanar with a motor Mr1 so as to reduce the space occupied by the entire door operator, especially in the length direction. Specifically, the motor Mr1 is kinematically connected to the deceleration module Dc by a belt B, and the deceleration module Dc is then kinematically connected to a first driven shaft 831 through a first chain Ch1. The ratchet module Mc is disposed on one end of the first driven shaft 831, and the manual chain disc module Cd is disposed on the other end of the first driven shaft 831. The ratchet module Mc is kinematically connected to a second driven shaft 832 through a second chain Ch2, the second driven shaft 832 is connected to the shaft R (see FIG. 1), the rotation-stopping module 84 is disposed on the second driven shaft 832, and the rotation-detecting module 7 is also kinematically connected to the second driven shaft 832 for detecting whether the second driven shaft 832 rotates or not.

Figure 10A:
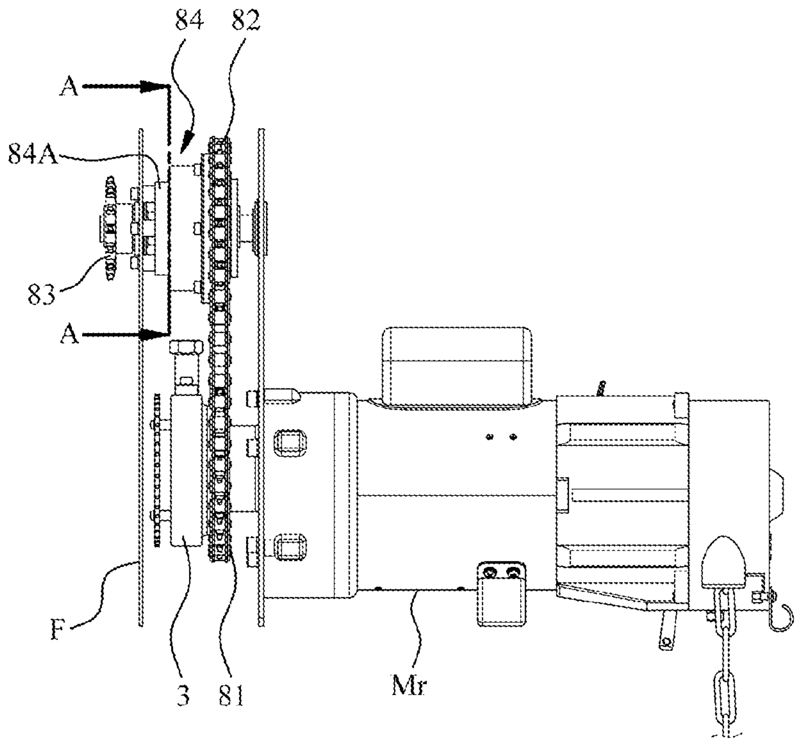
FIG. 10A is a perspective view of an eighth embodiment of the door operator of the present invention.
Figure 10B:
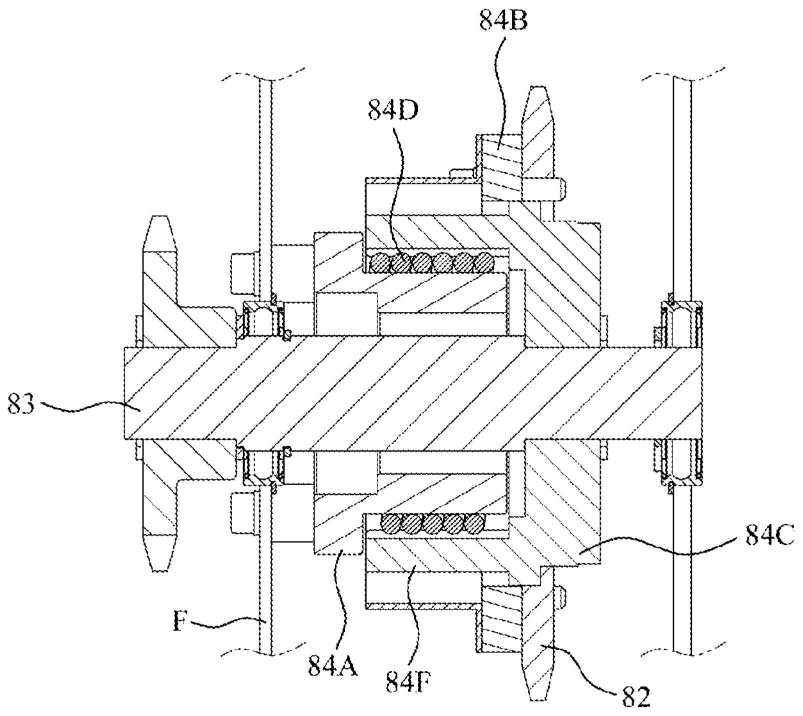
FIG. 10B is a cross-sectional view taken along the axial direction of a driven shaft in the eighth embodiment of the door operator of the present invention.
Figure 10C:
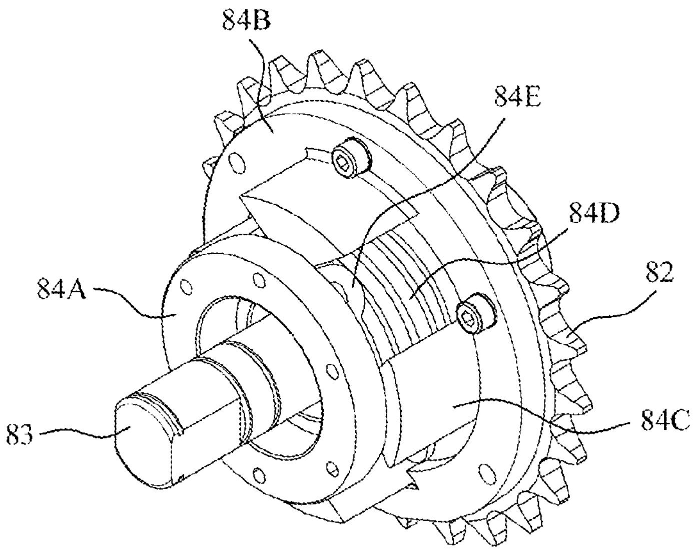
FIG. 10C is a perspective view of a rotation-stopping module in the eighth embodiment of the door operator of the present invention.
Figure 10D:
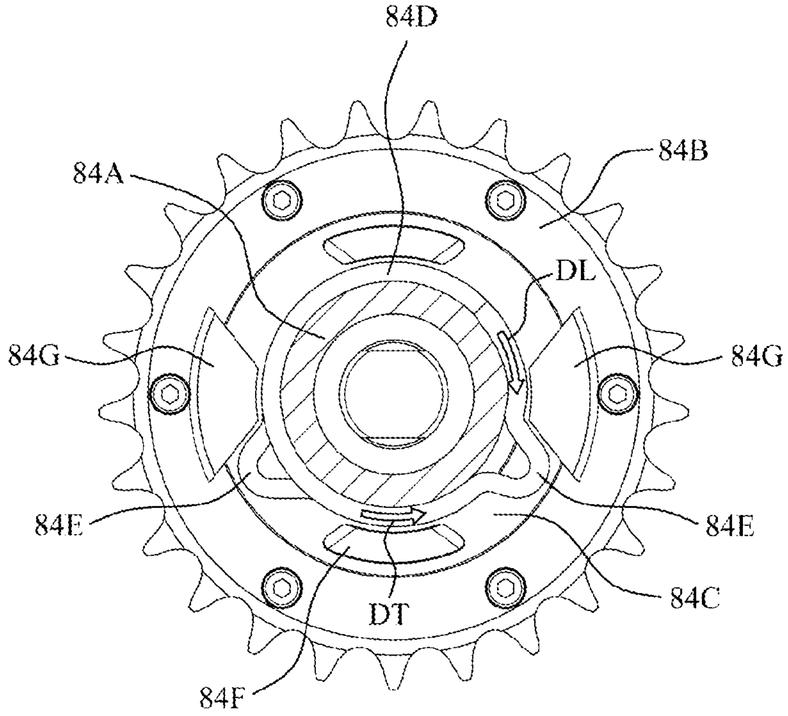
FIG. 10D is a cross-sectional view taken along lines A-A of FIG. 10A in accordance with an aspect of the subject invention.

Reference is made to FIG. 10A, FIG. 10B, FIG. 10C and FIG. 10D. FIG. 10A is a perspective view of the eighth embodiment of the door operator of the present invention, FIG. 10B is a cross-sectional view taken along the axial direction of a driven shaft in the eighth embodiment of the door operator of the present invention, FIG. 10C is a perspective view of a rotation-stopping module in the eighth embodiment of the door operator of the present invention, and FIG. 10D is a cross-sectional view taken along lines A-A of FIG. 10A in accordance with an aspect of the subject invention.

The main difference between this embodiment and the embodiments mentioned above lies in the configuration of the rotation-stopping module 84. The rotation-stopping module 84 of this embodiment mainly includes a frame sleeve 84A, a driven collar 84B, an output collar 84C and a helical spring 84D. The frame sleeve 84A is connected to the frame F, and the driven shaft 83 is rotatably inserted into a through hole of the frame sleeve 84A. The helical spring 84D is a wrap spring fitted on the frame sleeve 84A, and two ends of the helical spring 84D are respectively provided with a radial projection 84E.

Further, the output collar 84C is connected to the driven shaft 83 and provided with an axial finger 84F positioned between the radial projections 84E. The driven collar 84B is connected to the driven gear 82 and provided with two axial projections 84G, the axial finger 84F and the radial projections 84E are positioned between the two axial projections 84G.

Reference is made to FIG. 1 and FIG. 10D. When the motor assembly Mr is activated with the sleeve 3 being rotated by the motor assembly Mr, the driven gear 82 drives the driven collar 84B to rotate. At this time, the axial projection 84G pushes the radial projections 84E of the helical spring 84D to rotate the helical spring 84D in the opposite wrapping direction DL. Subsequently, the radial projection 84E pushes the axial finger 84F to rotate the output collar 84C, thereby driving the shaft R to rotate.

Moreover, in the case that the motor assembly Mr is deactivated, if someone tries to rotate the shaft R, the axial finger 84F pushes the radial projection 84E to rotate the helical spring 84D in the wrapping direction DT causing the helical spring 84D to wound on the frame sleeve 84A more tightly. Thus, the axial finger 84F is restricted to move only between the two radial projections 84E, and the output collar 84C cannot be rotated so that the shaft R is locked. Consequently, the slats Ds are difficult to lift, thereby realizing the anti-theft function.

The preferred embodiments of the present invention are illustrative only, and the claimed inventions are not limited to the details disclosed in the drawings and the specification. Accordingly, it is intended that it have the full scope permitted by the language of the following claims.

What is claimed is:

1. A sectional lifting door system, comprising a shaft, a torsional spring, at least one cable drum, at least one slat, at least one cable and a door operator, wherein the torsional spring is used for applying a specific preloaded torsion force on the shaft; the at least one cable drum is disposed on the shaft; one end of the at least one cable is connected to the at least one cable drum, and the other end of the at least one cable is connected to the at least one slat; the door operator is kinematically connected to the shaft and includes:

a ratchet, connected to an output shaft, the ratchet including a plurality of tooth spaces, each tooth space including a bottom wall, a first flank and a second flank, an included angle between the first flank and the bottom wall being less than or equal to 90 degrees, and an included angle between the second flank and the bottom wall being greater than 90 degrees;

a sleeve, fitted on the output shaft, the sleeve being kinematically connected to the shaft; and a pawl, disposed on the sleeve and selectively engaged with one of the plurality of tooth spaces of the ratchet, the pawl including a first surface and a second surface, the first surface being used for correspondingly contacting the first flank of the tooth space, the second surface being used for correspondingly contacting the second flank of the tooth space, wherein when the at least one slat is to be lifted, the output shaft is rotated so that the first flank of one of the plurality of tooth spaces of the ratchet is brought into contact with the first surface of the pawl, thereby driving the sleeve to rotate, and the sleeve further drives the shaft to wind the at least one cable around the at least one cable drum, wherein when the at least one slat is to be lowered, the output shaft is rotated so that the second flank of one of the plurality of tooth spaces of the ratchet is brought into contact with the second surface of the pawl, thereby driving the sleeve to rotate, and the sleeve further drive the shaft to unwind the at least one cable from the at least one cable drum; during a process of lowering the at least one slat, when a tensile force acting on the at least one cable drum is reduced, the second flank of one of the plurality of tooth spaces of the ratchet is disengaged from the second surface of the pawl so that rotation of the sleeve, the shaft and the at least one cable drum is stopped.

2. The sectional lifting door system of claim 1, wherein the door operator further includes a spring and an adjustable bolt; the sleeve includes a radial through hole; the pawl and the spring are accommodated in the radial through hole; the adjustable bolt is screwed into the radial through hole; the spring is interposed between the adjustable bolt and the pawl.

3. The sectional lifting door system of claim 1, wherein the door operator further includes a control unit, a motor assembly, and a rotation-detecting module; the motor assembly and the rotation-detecting module are electrically connected to the control unit; the motor assembly is adapted to be controlled by the control unit to drive the output shaft to rotate; and the rotation-detecting module is adapted to be controlled by the control unit to detect whether the shaft rotates or not; during the process of lowering the at least one slat, when the rotation-detecting module detects that rotation of the shaft is stopped, the control unit deactivates the motor assembly.

4. The sectional lifting door system of claim 3, wherein the door operator further includes a driving gear, a driven gear, a driven shaft and a rotation-stopping module; the driving gear is disposed on the sleeve, the driven gear is disposed on the driven shaft and engaged with the driving gear, the driven shaft is connected to the shaft, and the rotation-stopping module is disposed between the driven shaft and a frame; in a case that the motor assembly is not activated, the rotation-stopping module brakes the driven shaft.

5. The sectional lifting door system of claim 4, wherein the rotation-stopping module includes a driven disc, a brake disc and a compression spring; the driven disc is fitted on the driven shaft, one end of the compression spring is abutted against the brake disc, and the other end of the compression spring is abutted against the frame; the brake disc is normally biased against the driven disc by the compression spring for braking the driven shaft.

6. The sectional lifting door system of claim 5, wherein the rotation-stopping module further includes a magnetic field-generating unit, which is disposed on the frame and electrically connected to the control unit; when the motor assembly is activated, the magnetic field-generating unit attracts the brake disc so that the brake disc is separated from the driven disc.

7. The sectional lifting door system of claim 4, wherein the rotation-stopping module includes a fixed sleeve, a movable rotary disc, a movable sleeve and a sleeve clutch mechanism; the fixed sleeve is connected to the frame, the movable rotary disc is connected to the driven gear, the movable sleeve is fixed to the driven shaft, the sleeve clutch mechanism is disposed among the fixed sleeve, the movable rotary disc, and the movable sleeve; when the driven gear drives the movable rotary disc to rotate, the sleeve clutch mechanism urges the movable rotary disc to rotate the movable sleeve; when the movable rotary disc is not in rotation, the sleeve clutch mechanism urges the movable sleeve to be locked in the fixed sleeve.

8. The sectional lifting door system of claim 7, wherein the sleeve clutch mechanism includes at least one fixed column and at least one movable column; the at least one fixed column and the at least one movable column are accommodated in a gap between the fixed sleeve and the movable sleeve, and the at least one fixed column is connected to the movable rotary disc; the movable sleeve is provided with at least one radial protrusion; when the movable rotary disc is to be rotated, the at least one fixed column pushes the at least one movable column and rotates together with the movable sleeve; when the movable rotary disc is not in rotation, the at least one movable column is locked between the at least one radial protrusion and the fixed sleeve so that the movable sleeve is locked in the fixed sleeve.

9. The sectional lifting door system of claim 4, wherein the rotation-stopping module includes a frame sleeve, a driven collar, an output collar and a helical spring; the frame sleeve is connected to the frame, the helical spring is fitted on the frame sleeve, two ends of the helical spring are respectively provided with a radial projection; the output collar is connected to the driven shaft and provided with an axial finger, the axial finger is positioned between the radial projections; the driven collar is connected to the driven gear and provided with two axial projections, the axial finger and the radial projections are positioned between the two axial projections.

* * * * *